United States Patent [19]

Maeda et al.

[11] Patent Number: 4,952,633
[45] Date of Patent: Aug. 28, 1990

[54] RUBBER COMPOSITION

[75] Inventors: Akio Maeda; Kei Ueshima, both of Kawasaki, Japan

[73] Assignees: Nippon Zeon Co., Ltd.; The Yokohama Rubber Co., Ltd., both of Tokyo, Japan

[21] Appl. No.: 224,277

[22] Filed: Jul. 26, 1988

Related U.S. Application Data

[63] Continuation of Ser. No. 9,983, Feb. 2, 1987, abandoned.

[30] Foreign Application Priority Data

Feb. 3, 1986 [JP] Japan ................................ 61-21796

[51] Int. Cl.$^5$ ............................................. C08L 71/03
[52] U.S. Cl. .................................... 525/187; 525/523
[58] Field of Search ........................................ 525/187

[56] References Cited

U.S. PATENT DOCUMENTS 3,822,241 7/1974 Hani et al. ........................... 525/187
4,251,648 2/1981 Oetzel ................................. 525/187
4,694,067 9/1987 Maeda et al. .

FOREIGN PATENT DOCUMENTS 2567900 1/1986 France .

Primary Examiner—Jacob Ziegler
Attorney, Agent, or Firm—Armstrong, Nikaido, Marmelstein, Kubovcik & Murray

[57] ABSTRACT

Disclosed is a rubber composition comprising 85 to 55 wt. % of copolymer rubber and 15 to 45 wt. % of chloroprene rubber, wherein the copolymer rubber comprises 10 to 60 mole % of epichlorohydrin, 30 to 90 mole % of propylene oxide or of propylene oxide and ethylene oxide and 0 to 15 mole % of unsaturated epoxide.

6 Claims, No Drawings

RUBBER COMPOSITION

This application is a continuation of application Ser. No. 009,983 filed Feb. 2, 1987, now abandoned.

BACKGROUND

The present invention relates to a rubber composition which comprises a blend of epichlorohydrin-propylene oxide type copolymer rubber and chloroprene rubber, and has remarkably improved properties.

Among known oil-resistant rubber products, particularly chloroprene rubber (hereinafter referred to as CR) is known to have properties which are advantageously balanced and, as such, has been widely used for such as hose-covers, dust cover boots, belts and so forth in automobiles: CR has been put for use in view of its remarkable properties with respect to such as the oil resistance, the heat resistance, the low-temperature resistance, the ozone resistance, the resistance to bending and so on.

However, as the social demand for controlling the pollution of air has of late grown to be greater and, to cope with this, the control of exhaust gas from passenger cars has become more strongly regulated than before, there have been various improvements made in or relating to for example automobile engines. A result of this is that it is now required of CR to have a further improved heat resistance. However, CR can hardly answer such demand for a further improvement in its heat resistance, and since it is prone to undergo a curing-type deterioration and can hardly stand a long use, it is likely to give rise to a serious danger. Also, CR has a crystalline structure and is regarded as being unsuited for use in cold areas, and it in addition involves a problem with respect to the dynamic ozone proof.

Then, with epichlorohydrin-ethylene oxide copolymer rubber (hereinafter referred to as CHC), although this has exceeding properties in comparison to CR, with respect to the heat resistance, oil resistance, low-temperature resistance and dynamic ozone resistance, it fails to be satisfactory with respect to the resistance to bending and it is not suitable for use as material which is required to possess high dynamic characteristics.

With epichlorohydrin-propylene oxide type copolymer rubber, then, while it exceeds CR in respect of the heat resistance, oil resistance, low-temperature resistance and dynamic ozone resistance, it fails to be comparable to CR in respect of the flexibility.

SUMMARY

Accordingly, it is a primary object of the present invention to provide such a rubber composition which has an oil resistance and a resistance to bending comparable to those of CR and which is improved over CR with respect to the heat resistance, low-temperature resistance and dynamic ozone resistance.

The above object is attained according to the present invention by providing a rubber composition characterized by comprising 85 to 55 wt. % of a copolymer rubber and 15 to 45 wt. % of chloroprene rubber, wherein the copolymer rubber comprises 10 to 60 mole % of epichlorohydrin, 30 to 90 mole % of propylene oxide or of propylene oxide and ethylene oxide (providing the molar ratio of propylene oxide and ethylene oxide is 1 or higher) and 0 to 15 mole % of unsaturated epoxide.

THE PREFERRED EMBODIMENTS

In or for the present invention, the copolymer rubber is obtainable by copolymerization of epichlorohydrin with propylene oxide or of propylene oxide with ethylene oxide, further with unsaturated epoxide as needs be.

Unsaturated epoxide includes allyl glycidyl ether, glycidyl methacrylate, glycidyl acrylate and butadiene monoxide. With the unsaturated epoxide copolymerized, it is feasible to obtain an improvement with respect to the softening deterioration by heat and the dynamic ozone resistance, but if the molar ratio of the unsaturated epoxide exceeds 15 mole %, then the copolymer rubber tends to undergo a curing-type deterioration, lose the rubber elasticity and become brittle. Whereas the amount of propylene oxide or the total amount of propylene oxide and ethylene oxide may be suitably determined within a range of 30 to 90 mole % in consideration of low-temperature resistance values to be obtained of molded rubber products, if the amount or the total amount in reference is less than 30 mole %, a problem is likely to be posed relating to the low-temperature resistance, while if it exceeds 90 mole % it is likely that the oil resistance is lowered and the degree of swelling is increased. Particularly preferable proportions of the copolymerization components are 15 to 55 mole % for epichlorohydrin, 35 to 85 mole % for propylene oxide or for propylene oxide and ethylene oxide in combination, and 2 to 10 mole % for unsaturated epoxide. Further, if the molar ratio of propylene oxide and ethylene oxide is less than 1, then it is infeasible to obtain a satisfactory resistance against bending.

For or in the present invention, chloroprene rubber means a homopolymer of 2-chloro-1,3-butadiene or a copolymerized rubber of 2-chloro-1,3-butadiene and a monomer copolymerizable therewith, and includes a sulfur-modified copolymerized rubber.

In the blend of the copolymer rubber and the chloroprene rubber according to the invention, the proportion of the copolymer rubber may be appropriately determined within a range of 85 to 55 wt. % in consideration of the required particular properties of molded rubber products. With a proportion exceeding 85 wt. %, it is infeasible to obtain a satisfactory resistance to bending, while with an amount not reaching 55 wt. %, a problem is likely concerning the dynamic ozone resistance.

With regard to the curing agent for the blend of copolymer rubber and the chloroprene rubber, now that both components of the blend contain chlorine atoms, use may be made of a polythiol type curing agent and a thiourea type curing agent which cause a curing reaction through the chlorine atoms, and in the cases of a copolymer rubber copolymerized with unsaturated epoxide and a chloroprene rubber containing an unsaturated double bond, it is also feasible to use a sulfur type curing agent.

For the polythiol type curing agent, use may be made of such ones as being normally used for CHC, for example such as di- or trithiol-S-triazine compounds (disclosed in for example U.S. Pat. No. 3,787,376), 2,5-dimercapto-1,3,4-thiadiazole compounds (disclosed in for example U.S. Pat. No. 4,288,576), 2,3-dimercapto-pyrazine compounds (disclosed in for example Japanese patent publication No. 58-14468), 2,3-dimercapto-quinoxaline compounds (disclosed in for example Japanese patent publication No. 58-14469), and 3,5-dimercapto-1,2,4-triazole compounds (disclosed in for example Japanese patent publication No. 57-46463).

Then, the thiourea type curing agent includes 2-mercapto-imidazoline (ethyl thiourea) compounds and 2-mercapto-pyrimidine compounds (both disclosed in for example U.S. Pat. No. 3,341,490).

The sulfur type curing agent may be any of the ones normally used for diene type rubber and includes such as sulfur and sulfur donors, for example morpholine disulfide, thiuram compounds such as tetramethyl thiuram disulfide for example and high molecular polysulfur compounds.

The use amount of the curing agent, based on 100 parts by weight of the blend of polymer rubber and chloroprene rubber, is within a range of 0.1 to 5 parts by weight in the case of sulfur, while it is within a range of 0.1 to 10 parts by weight in the cases of other sulfur type curing agent. Further, it is feasible to make a co-use of curing agents of different kinds.

The rubber composition according to the present invention can be prepared by blending together a copolymerized rubber of epichlorohydrin and propylene oxide, or of propylene oxide and ethylene oxide, and further with unsaturated epoxide as needs be, and chloroprene rubber, and blending with the resulting mixture a curing agent and, if necessary, a compounding material for rubber such as a vulcanization accelerator, reinforcing agent, filler, plasticizer, antioxidant and so forth in or by an ordinarily employed mixer, for example rollers or a Banbury mixer.

The resulting rubber composition will be heated in a mold as desired at a temperature normally of 100 to 250° C. to obtain a cured rubber product.

Cured rubber products made with use of the rubber composition according to the present invention are possessed of remarkable characteristics with respect to each of the oil resistance, the bending resistivity, the heat resistance, the low-temperature resistance and the dynamic ozone resistance, therefore they are advantageously useful not only for hose covers but also particularly for such members which are required to possess dynamic characteristics such as dust-cover boots and belts in automobiles.

Now, the present invention will be described in greater detail with reference to specific examples and comparative examples, and in the following description, the numerical values for the blending recipes and the rubber compositions mean parts by weight.

EXAMPLE 1

Epichlorohydrin-propylene oxide-allyl glycidyl ether type copolymer rubber which was prepared with use of an organoaluminum compound type polymerization catalyst and by a solution polymerization process known per se and chloroprene rubber were together blended, with other compounding agents, according to the following blending recipe in a cooling roller, and the resulting blend was heated at 170° C. for 15 minutes to obtain cured rubber products.

| Blending Recipe | |
| --- | --- |
| Epichlorohydrin-propylene oxide-allyl glycidyl ether copolymer rubber | 70 |
| Neoprene WXJ*[1] | 30 |
| Stearic acid | 1 |
| HAF carbon | 30 |
| FEF carbon | 10 |
| Zinc oxide | 5 |
| Magnesium oxide | 1.5 |
| Aromatic softening agent*[2] | 5 |
| Sulfur | 0.7 |
| Tetramethyl thiuram disulfide | 1 |
| Cyclohexylbenzothiazylsulfeneamide | 1 |
| 2-mercapto imidazoline | 0.3 |
| Nickel dibutyl dithiocarbamate | 1 |
| Octylated diphenylamine | 0.5 |
| N-phenyl-N-isopropyl-p-phenylene diamine | 0.5 |

*[1] product of Showa Neoprene Co., Ltd.
*[2] F Flex M, product of Fuji Kosan Co., Ltd.

Of the above obtained cured rubber products, the properties were determined according to JISK-6301 to obtain results as entered in the following Table 1. From considering the Table 1, it is clearly seen that the cured rubber product of Experiment No. 5 (Comparative Example) is poor in the low-temperature resistance and the blending resistivity.

TABLE 1

| | Experiment No. | | | | |
| --- | --- | --- | --- | --- | --- |
| | Examples of Invention | | | | Comp. Ex. |
| Test Items | 1 | 2 | 3 | 4 | 5 |
| Composition of copolymer rubber (mole %): | | | | | |
| Epichlorohydrin | 20 | 30 | 55 | 30 | 70 |
| Propylene oxide | 77 | 67 | 42 | 37 | 27 |
| Ethylene oxide | — | — | — | 30 | — |
| Allyl glycidyl ether | 3 | 3 | 3 | 3 | 3 |
| Properties in ordinary state: | | | | | |
| Tensile strength (kg/cm$^2$) | 163 | 177 | 184 | 188 | 190 |
| Elongation (%) | 430 | 440 | 460 | 470 | 490 |
| Hardness (JIS) (point) | 63 | 64 | 65 | 66 | 67 |
| JIS No. 3 Oil Dipping Test (dipping for 70 hours at 120° C.): | | | | | |
| Volume change (%) | +91 | +79 | +57 | +65 | +51 |
| Brittle point temperature | −48 | −45 | −37 | −47 | −29 |
| De Mattia Flex Test: | | | | | |
| Crack initiation number | more than 500,000 times | | | | 320,00 times |

EXAMPLE 2

Copolymer rubber of epichlorohydrin (30 mole %) -propylene oxide (67 mole %)-allyl glycidyl ether (3 mole %) and chloroprene rubber were together blended, with other compounding agents, according to the blending recipe recited in the following Table 2, in a cooling roller, and with use of the resulting blend according to the blending recipe entered in the below Table 3, mixtures were prepared by a cooling roller.

TABLE 2

| Rubber and Compounding agents | Copolymer rubber | Chloroprene rubber |
| --- | --- | --- |
| Copolymer rubber | 100 | |
| Neoprene WXJ*[1] | | 100 |
| Stearic acid | 1 | 1 |
| HAF carbon | 45 | |
| FEF carbon | | 45 |
| Zinc oxide | 5 | 5 |
| Magnesium oxide | | 4 |
| Aromatic softening agent*[2] | | 10 |
| Sulfur | 1 | |
| Tetramethyl thiuram disulfide | 1.5 | |
| Cyclohexylbenzothiazylsulfeneamide | 1.5 | |
| 2-mercapto imidazoline | | 0.5 |
| Nickel dibutyl dithiocarbamate | 1.5 | |

*[1] product of Showa Neoprene Co., Ltd.
*[2] F Flex M, product of Fuji Kosan Co., Ltd.

A determination of properties of cured rubber products was carried out according to JISK-6301. A grease dipping test was conducted according to JISK-6301 with use for the testing grease of Molilex No. 2 (product of Kyodo Oil & Fats Co., Ltd.). Further, a dynamic ozone deterioration test was operated at an ambient temperature of 40° C., at an ozone concentration of 50 pphm and under a dynamic condition with an elongation of 0 to 30% imparted to test samples, to find generation of cracks. Results of the determinations and tests are shown in the following Table 3.

TABLE 3

| | Experiment No. | | | | | |
|---|---|---|---|---|---|---|
| | Comp. Ex. | Invention | | | | Comp. Ex. |
| Test Items | 6 | 7 | 8 | 9 | 10 | 11 |
| Copolymer rubber | 100 | 90 | 80 | 70 | 60 | 50 |
| Chloroprene rubber | — | 10 | 20 | 30 | 40 | 50 |
| Properties in ordinary state: | | | | | | |
| Tensile strength (kg/cm$^2$) | 182 | 183 | 187 | 185 | 187 | 182 |
| Elongation (%) | 520 | 470 | 440 | 430 | 440 | 410 |
| Hardness (JIS) (point) | 67 | 67 | 66 | 63 | 62 | 61 |
| Aging test by heating in air (heating for 240 hours, at 120° C.): | | | | | | |
| Tensile strength change (%) | −14 | −17 | −18 | −21 | −21 | −25 |
| Elongation change (%) | −61 | −59 | −62 | −58 | −60 | −60 |
| Hardness change (point) | +14 | +15 | +15 | +14 | +15 | +17 |
| JIS No. 3 Oil Dipping Test (dipping for 70 hours, at 120° C.): | | | | | | |
| Volume change (%) | +69 | +71 | +74 | +79 | +82 | +86 |
| Grease Dipping Test (dipping for 70 hours, at 120° C.): | | | | | | |
| Volume change (%) | +24 | +26 | +27 | +29 | +29 | +31 |
| Tensile strength change (%) | −2 | −10 | −18 | −24 | −21 | −19 |
| Elongation change (%) | −5 | −16 | −19 | −25 | −23 | −27 |
| Hardness change (point) | −16 | −16 | −15 | −15 | −14 | −13 |
| Brittle point temperature (°C.) | −47 | −47 | −46 | −45 | −43 | −42 |
| Dynamic Ozone Deterioration Test (for 100 hours): | | no cracking | | | | * |
| De Mattia Flex Test: | | | | | | |
| Crack initiation number | 410,000 times | more than 500,000 times | | | | 450,000 times |

*Many deep cracks shorter than 1 mm in length were generated.

EXAMPLE 3

Except that the

| Blending Recipe | |
|---|---|
| Neoprene WXJ*$^1$ | 100 |
| Stearic acid | 1 |
| FEF carbon | 40 |
| Zinc oxide | 5 |
| Magnesium oxide | 4 |
| Aromatic softening agent*$^2$ | 10 |
| Sulfur | 1 |

-continued

| Blending Recipe | |
|---|---|
| Tetramethyl thiuram disulfide | 1 |
| di-o-tolylguanidine | 1 |

*$^1$ and *$^2$Same as in Table 2 above.

ratio of chloroprene rubber was changed as in the following blending recipe, the above Example 2 was repeated and determinations/tests were conducted as in the Example 2. The results of the determinations/tests are entered in the below Table 4.

| Blending Recipe | |
|---|---|
| Neoprene WXJ*$^1$ | 100 |
| Stearic acid | 1 |
| FEF carbon | 40 |
| Zinc oxide | 5 |
| Magnesium oxide | 4 |
| Aromatic softening agent*$^2$ | 10 |
| Sulfur | 1 |
| Tetramethyl thiuram disulfide | 1 |
| di-o-tolylguanidine | 1 |

*$^1$ and *$^2$Same as in Table 2 above.

TABLE 4

| | Experiment No. | | | | | |
|---|---|---|---|---|---|---|
| | Comp. Ex. | Invention | | | | Comp. Ex. |
| Test Items | 12 | 13 | 14 | 15 | 16 | 17 |
| Copolymer rubber | 100 | 90 | 80 | 70 | 60 | 50 |
| Chloroprene rubber | — | 10 | 20 | 30 | 40 | 50 |
| Properties in ordinary state: | | | | | | |
| Tensile strength (kg/cm$^2$) | 182 | 186 | 191 | 188 | 190 | 189 |
| Elongation (%) | 520 | 450 | 430 | 400 | 390 | 370 |
| Hardness (JIS) (point) | 67 | 66 | 65 | 65 | 64 | 62 |
| Aging test by heating in air (heating for 240 hours, at 120° C.): | | | | | | |
| Tensile strength change (%) | −14 | −17 | −19 | −21 | −26 | −25 |

TABLE 4-continued

| | Comp. Ex. | Invention | | | | Comp. Ex. |
|---|---|---|---|---|---|---|
| Test Items | 12 | 13 | 14 | 15 | 16 | 17 |
| Elongation change (%) | −61 | −61 | −60 | −63 | −63 | −66 |
| Hardness change (point) | +14 | +14 | +14 | +15 | +16 | +15 |
| JIS No. 3 Oil Dipping Test (dipping for 70 hours, at 120° C.): | | | | | | |
| Volume change (%) | +69 | +70 | +70 | +73 | +74 | +76 |
| Grease Dipping Test (dipping for 70 hours, at 120° C.): | | | | | | |
| Volume change (%) | +24 | +26 | +27 | +29 | +29 | +28 |
| Tensile strength change (%) | −2 | −7 | −11 | −17 | −18 | −16 |
| Elongation change (%) | −5 | −10 | −15 | −22 | −24 | −27 |
| Hardness change (point) | −16 | −16 | −15 | −15 | −13 | −11 |
| Brittle point temperature (°C.) | −47 | −45 | −44 | −43 | −42 | −40 |
| Dynamic Ozone Deterioration Test (for 100 hours): | | no cracking | | | | * |
| De Mattia Flex Test: | | | | | | |
| Crack initiation number | 410,000 times | more than 500,000 times | | | | 200,000 times |

*Many deep cracks shorter than 1 mm in length were generated.

EXAMPLE 4

Copolymer rubber of epichlorohydrin (30 mole %)-propylene oxide (67 mole %)-allyl glycidyl ether (3 mole %) and chloroprene rubber were blended according to the blending recipe entered in the following Table 5 and same determinations and tests as in Example 2 were carried out. The results of the determinations and tests are entered in Table 6.

TABLE 5

| Rubber and Compounding agents | Copolymer rubber | | Chloroprene rubber | | |
|---|---|---|---|---|---|
| | A | B | C | D | E |
| Copolymer rubber | 100 | 100 | | | |
| Neoprene WXJ*[1] | | | 100 | 100 | 100 |
| Stearic acid | 1 | 3 | 1 | 1 | 1 |
| HAF carbon | 40 | 40 | | | |
| FEF carbon | | | 40 | 40 | 40 |
| Red lead | 5 | | | | |
| Magnesium oxide | | 3 | 4 | 4 | 4 |
| Zinc oxide | | | 5 | 5 | 5 |
| Aromatic softening agent*[2] | | | 10 | 10 | 10 |
| 2-mercaptoimidazoline | 0.8 | | 0.5 | | |
| 2,4,6-trimercapto-s-triazine | | 0.6 | | 0.6 | |
| 1,3-diphenylguanidine | | 0.5 | | | |
| Sulfur | | | | | 1 |
| Tetramethyl thiuram disulfide | | | | | 1 |
| di-o-tolylguanidine | | | | | 1 |
| Nickel dimethyldithio carbamate | 1.5 | 1.5 | | | |

*[1] and *[2]Same as in Table 2 above

TABLE 6

| | Present Invention Experiment No. | | | |
|---|---|---|---|---|
| Test Items | 18 | 19 | 20 | 21 |
| Copolymer rubber blends | A | B | A | A |
| Chloroprene rubber blends | C | C | D | E |
| Copolymer rubber | 70 | 70 | 70 | 70 |
| Chloroprene rubber | 30 | 30 | 30 | 30 |

TABLE 6-continued

| | Present Invention Experiment No. | | | |
|---|---|---|---|---|
| Test Items | 18 | 19 | 20 | 21 |
| Properties in ordinary state: | | | | |
| Tensile strength (kg/cm²) | 149 | 129 | 121 | 126 |
| Elongation (%) | 450 | 440 | 360 | 340 |
| Hardness (JIS) (point) | 63 | 61 | 63 | 61 |
| JIS No. 3 Oil Dipping Test (dipping for 70 hours, at 120° C.): | | | | |
| Volume change (%) | +67 | +71 | +72 | +69 |
| Brittle point temperature (°C.) | −46 | −47 | −46 | −44 |

We claim:
1. A rubber composition comprising:
   (A) 85 to 55 weight % of a copolymer rubber;
   (B) 15 to 45 weight % of chloroprene rubber; and
   (C) a sulfur-containing curing agent; wherein said copolymer rubber (A) comprises
   (1) 10 to 60 mole % of epichlorohydrin;
   (2) 30 to 90 mole % of a component selected from the group consisting of (i) propylene oxide and (ii) a mixture of propylene oxide and ethylene oxide wherein the molar ratio of propylene oxide to ethylene oxide is at least 1; and
   (3) 2 to 15 mole % of an unsaturated epoxide.
2. A rubber composition as in claim 1, wherein said copolymer rubber (A) comprises:
   (1) 15 to 55 mole % of epichlorohydrin;
   (2) 35 to 85 mole % of propylene oxide or mixture of propylene oxide and ethylene oxide; and
   (3) 2 to 10 mole % of unsaturated epoxide.
3. A rubber composition as in claim 1, wherein said unsaturated epoxide is selected from the group consisting of allyl glycidyl ether, glycidyl methacrylate, glycidyl acrylate and butadiene monoxide.
4. A rubber composition as in claim 1, wherein said sulfur-containing curing agent is sulfur.
5. A rubber composition as in claim 1, wherein said sulfur-containing curing agent is a polythiol-containing curing agent.
6. A rubber composition as in claim 1, wherein said sulfur-containing curing agent is a thiourea-containing curing agent.

* * * * *